(12) United States Patent
Ochi

(10) Patent No.: US 7,053,015 B2
(45) Date of Patent: May 30, 2006

(54) SBN GLASS CERAMICS SYSTEM (75) Inventor: Yasuo Ochi, Kunitachi (JP)

(73) Assignee: Kabushiki Kaisha Ohara, Sagamihara (JP)

( * ) Notice: Subject to any disclaimer, the term of this patent is extended or adjusted under 35 U.S.C. 154(b) by 95 days.

(21) Appl. No.: 10/506,178

(22) PCT Filed: Mar. 10, 2003

(86) PCT No.: PCT/JP03/02796

§ 371 (c)(1), (2), (4) Date: Aug. 31, 2004

(87) PCT Pub. No.: WO03/078344

PCT Pub. Date: Sep. 25, 2003

(65) Prior Publication Data
US 2005/0107237 A1 May 19, 2005

(30) Foreign Application Priority Data
Mar. 15, 2002 (JP) .............................. 2002-072364
Apr. 19, 2002 (JP) .............................. 2002-117041

(51) Int. Cl.
C03C 10/02 (2006.01)

(52) U.S. Cl. ........................................................ 501/10
(58) Field of Classification Search ................... 501/10
See application file for complete search history.

(56) References Cited

U.S. PATENT DOCUMENTS

| | | | | |
|---|---|---|---|---|
| 3,615,757 A | * | 10/1971 | Herczog et al. ............... | 501/10 |
| 3,935,019 A | * | 1/1976 | Rapp ............................ | 501/10 |
| 6,248,678 B1 | * | 6/2001 | Pinckney ...................... | 501/10 |
| 2002/0032113 A1 | | 3/2002 | Nakajima | |

FOREIGN PATENT DOCUMENTS

| | | |
|---|---|---|
| JP | 47-2120 | 1/1972 |
| JP | 47-14119 | 4/1972 |
| JP | A 2000-143289 | 5/2000 |
| JP | A 2001-48581 | 2/2001 |
| JP | A 2001-148114 | 5/2001 |

OTHER PUBLICATIONS

Shyu et al., "Crystallization and Dielectric Properties of SrO-BaO-$Nb_2O_5$SiO$_2$ Tungsten-Bronze Glass-Ceramics." Journal of American Ceramics, vol. 83, No. 12, pp. 3135-3140, 2000.

* cited by examiner

*Primary Examiner*—Karl Group
(74) *Attorney, Agent, or Firm*—Oliff & Berridge, PLC (57) ABSTRACT

A glass ceramics having a chemical composition of $aRO.bNb_2O_5.cSiO_2.dB_2O_3.eTeO_2.fX$ (where R represents Ba and/or Sr, X represents one or more oxide selected from the group consisting of $TiO_2$, $ZrO_2$, $P_2O_5$ and ZnO, $a>b \geq 0.05$, $0.60 \geq c \geq 0$, $0.70 \geq d \geq 0$, $0.70 \geq e \geq 0$, $c+d+e \geq 0.175$, $a+b+c+d+e=1.0$ and $0.10 \geq f \geq 0$). The ratio dielectric constant at 1 kHz $\epsilon_1$ to dielectric constant at 100 kHz $\epsilon_{100}$ ($\epsilon_1/\epsilon_{100}$) is 10 or more.

10 Claims, 1 Drawing Sheet

SBN GLASS CERAMICS SYSTEM

TECHNICAL FIELD

The present invention is related to a SBN glass ceramics system represented by a chemical composition of $aRO \cdot bNb_2O_5 \cdot cSiO_2 \cdot dB_2O_3 \cdot eTeO_2 \cdot fX$ (where R represents Ba and/or Sr and X represents one or more oxide selected from the group consisting of $TiO_2$, $ZrO_2$, $P_2O_5$ and ZnO).

BACKGROUND ART

SBN (strontium barium niobate) is a ferroelectric inorganic crystal belonging to tungsten bronze type, and has the Curie point thereof at near room temperature. As for the application to electrical materials, the SBN is being put to practical use as a surface acoustic wave material, since it has piezoelectric property and pyroelectricity because of the ferroelectric property thereof, and especially the piezoelectric property is significant. Further, since a SBN single crystal transmits light, it is expected to be applied to an opto-electronics material for advanced information communication and processing. It is expected that SBN is used in broad range of applications.

Though the SBN has a fine characteristics as described above, only SBN single crystal has been supplied. Since the single crystal has no pores leading to scattering of light and phonon, it has high performances in dielectricity and opto-electronics. However, manufacturing the single crystal requires advanced techniques, it is difficult to produce it in large quantities, and it is inevitable to be high priced.

In order to cope with these problems, a SBN ceramic was developed. S. B. Deshpande et al. measured various electrical properties of SBN ceramics, and obtained the ceramic having the Sr/Ba ratio thereof of 0.50 and dielectric constant $\epsilon_1$ of 1100 (30° C.) (J. Amer. Ceram. Soc., 75[9] 2581–85 (1992)). However, pores in the sintered body of a ceramic cause dispersion of light and phonon and decrease of its mechanical strength and electrical properties.

Recently, a glass ceramics has been known as a material which overcomes the defects of ceramics. The glass ceramics is fabricated by crystallizing the glass. It is aimed that mechanical properties, electromagnetic properties, optical properties and thermal properties can be controlled by the size and the amount of the deposited crystal and the combination of the deposited crystal and glass matrix. However, techniques have not been accumulated to rise to the level where the properties are freely controlled.

In 1964, A. Herezog disclosed a research of barium titanate glass ceramics as a trial to obtain a glass ceramics applicable to a ferroelectric application. The disclosed glass ceramics consists of dielectric crystals of 1μ or less in average and glass matrix. Further, it does not contain micro pores, dose not allow gas and liquid to pass through, and has large dielectric constant despite it contains much matrix.

Furthermore, in December 2000, Jiin-Jyh Shyu, et al. presented a paper disclosing SBN glass ceramics produced by crystallizing a glass of $22.5SrO\text{-}22.5BaO\text{-}20Nb_2O_5\text{-}35SiO_2$ (mol %). It was disclosed that the glass ceramics shows the dielectric constant thereof of 190 (1 kHz) (J. Amer. Ceram. Soc., 83[12]3135–40(2000)).

The object of the present invention is to provide an economical SBN (strontium barium niobate) glass ceramics having superior dielectric constant and transparency.

DISCLOSURE OF INVENTION

The present inventor has focused on the glass ceramics as a SBN and has researched it, and has found a composition of an economical high dielectric glass ceramics having no micro pores. Thus, the inventor achieved the present invention.

That is, according to the first aspect of the invention, the glass ceramics of the invention has a chemical composition formula of $aRO \cdot bNb_2O_5 \cdot cSiO_2 \cdot dB_2O_3 \cdot eTeO_2 \cdot fX$ (where R represents Ba and/or Sr, X represents one or more oxide selected from the group consisting of $TiO_2$, $ZrO_2$, $P_2O_5$ and ZnO, $a>b \geq 0.05$, $0.60 \geq c \geq 0$, $0.70 \geq d \geq 0$, $0.70 \geq e \geq 0$, $c+d+e \geq 0.175$, $a+b+c+d+e=1.0$ and $0.10 \geq f > 0$).

It is preferable that the chemical composition formula is $aRO \cdot bNb_2O_5 \cdot cSiO_2 \cdot fX$ (where R represents Ba and/or Sr, X represents one or more oxide selected from the group consisting of $TiO_2$, $ZrO_2$, $P_2O_5$ and ZnO, $a>b \geq 0.05$, $0.60 \geq c \geq 0.30$, $a+b+c=1.0$ and $0.10 \geq f \geq 0$).

Further, according to the second aspect of the invention, the glass ceramics of the invention comprises two or more glass formers selected from the group consisting of silicon oxide, boron oxide and tellurium oxide, and the chemical composition formula thereof is $aRO \cdot bNb_2O_5 \cdot cSiO_2 \cdot dB_2O_3 \cdot eTeO_2 \cdot fX$ (where R represents Ba and/or Sr, X represents one or more oxide selected from the group consisting of $TiO_2$, $ZrO_2$, $P_2O_5$ and ZnO, $a>b \geq 0.05$, $0.55 \geq c \geq 0$, $0.70 \geq d \geq 0$, $0.70 \geq e \geq 0$, $c+d+e > 0.175$, $a+b+c+d+e=1.0$ and $0.10 \geq f \geq 0$).

Further, according to the third aspect of the invention, the glass ceramics of the invention has a chemical composition formula of $aRO \cdot bNb_2O_5 \cdot dB_2O_3 \cdot fX$ (where R represents Ba and/or Sr, X represents one or more oxide selected from the group consisting of $TiO_2$, $ZrO_2$, $P_2O_5$ and ZnO, $a>b \geq 0.05$, $0.70 \geq d \geq 0.175$, $a+b+d=1.0$ and $0.10 \geq f \geq 0$).

Further, according to the fourth aspect of the invention, the glass ceramics of the invention has a chemical composition formula of $aRO \cdot bNb_2O_5 \cdot eTeO_2 \cdot fX$ (where R represents Ba and/or Sr, X represents one or more oxide selected from the group consisting of $TiO_2$, $ZrO_2$, $P_2O_5$ and ZnO, $a>b \geq 0.05$, $0.70 \geq e \geq 0.35$, $a+b+e=1.0$ and $0.10 \geq f \geq 0$).

It is preferable that the ratio dielectric constant at 1 kHz $\epsilon_1$ to dielectric constant at 100 kHz $\epsilon_{100}$ ($\epsilon_1/\epsilon_{100}$) is 10 or more in the glass ceramics of the invention.

The glass ceramics of the invention has a chemical composition formula of $aRO \cdot bNb_2O_5 \cdot cSiO_2 \cdot dB_2O_3 \cdot eTeO_2 \cdot fX$, where a and b are within a range of $a>b \geq 0.05$. When the composition is over this range, it is not possible to obtain a transparent original glass.

Here, R represents Ba and/or Sr. When let the ratio Sr/Ba increase, the Curie point decreases continuously from about 200° C. to about 25° C. The dielectric constant shows its maximum at Curie point, and the dielectric constant decreases with the temperature getting away from the Curie point. By the use of this relation, it is possible to control the dielectric constant at the operating temperature.

According to the glass ceramics of the invention, a material for glass former which forms glass network is preferably silicon oxide, boron oxide and tellurium oxide.

When silicon oxide is used as the glass former, it has the advantage that the resistance to water and alkali resistance are fine, while it has the defect that the glass forming composition range is narrow and the melting temperature is high. As for the range of c, $0.60 \geq c \geq 0$ is preferable, $0.60 \geq c \geq 0.30$ is more preferable and $0.55 > 0.30$ is particularly preferable.

When boron oxide is used as the glass former, it has the advantage that the glass forming composition range is wide and the melting temperature is low, while it has the defect that the moisture resistance and chemical resistance are poor. Further, in a composition that the concentration of boron oxide is high, a transparent glass ceramics can be obtained. As for the range of d, $0.70 \geq d \geq 0$ is preferable and $0.70 \geq d \geq 0.175$ is more preferable.

When tellurium oxide is used as the glass former, it can be vitrificated in wider range compared to the silicon oxide glass former. As for the range of e, $0.70 \geq e \geq 0$ is preferable and $0.70 \geq e \geq 0.35$ is more preferable.

Furthermore, it is effective to combine these glass formers for enlarging the glass forming composition range and improving the properties. The glass ceramics comprising two or more glass formers selected from the group consisting of silicon oxide, boron oxide and tellurium oxide preferably has the chemical composition formula thereof within the range represented as $aRO \cdot bNb_2O_5 \cdot cSiO_2 \cdot dB_2O_3 \cdot eTeO_2 \cdot fX$ (where R represents Ba and/or Sr, X represents one or more oxide selected from the group consisting of $TiO_2$, $ZrO_2$, $P_2O_5$ and ZnO, $0.55 \geq c \geq 0$, $0.70 \geq d \geq 0$, $0.70 \geq e \geq 0$, $a+b+c+d+e=1.0$, $c+d+e \geq 0.175$, $0.10 \geq f > 0$).

The glass ceramics of the invention preferably contains $TiO_2$, $ZrO_2$, $P_2O_5$ and ZnO as a crystal nuclei forming agent. As for the range of f, $0.10 \geq f \geq 0$ is preferable, $0.10 \geq f > 0$ is more preferable and $0.05 \geq f > 0$ is particularly preferable.

The glass ceramics of the invention preferably has high frequency dependence of the dielectric constant thereof. Concretely, it is preferable that the ratio dielectric constant at 1 kHz $\epsilon_1$ to dielectric constant at 100 kHz $\epsilon_{100}$ ($\epsilon_1/\epsilon_{100}$) is 10 or more. In order to obtain large frequency dependence, the glass ceramics of the invention preferably has the composition thereof which fulfills $0.32 < a$, $0.14 < b$ and $0.42 < c$.

The dielectric loss tan δ of the glass ceramics of the invention is preferably $1 \times 10^{-2}$ or less, and more preferably $5 \times 10^{-3}$ or less.

In manufacturing the glass ceramics of the invention, salts such as oxides, hydrides, carbonates, nitrates and the like, halides, borates and the like can be used as the starting material. These materials are melted and quenched to obtain a transparent original glass, and a heat treatment is performed in order to deposit and grow SBN crystals, so that the glass ceramics of the invention is obtained.

In manufacturing the glass ceramics of the invention, it is preferable that the melting temperature of the original glass is 1300° C. or more in a case of silicate glass system, 1100° C. or more in a case of borate glass system, and 900° C. or more in a case of tellurium oxide glass system. The melting period is preferably 30 minutes or more and more preferably 3 hours or more.

The quenched original glass easily contains a thermal distortion. In order to remove the distortion, preferably, the original glass is annealed. The annealing temperature is preferably 500° C. or more in order to remove the distortion sufficiently, and is preferably 600° C. or less in order to prevent from a deposition of crystal nuclei. The annealing period is preferably 1 hour or more, and more preferably 3 hours or more.

In manufacturing the SBN glass ceramics system of the invention, it is preferable that the crystallization temperature is 800° C. or more in a case of silicate system, 450° C. or more in a case of tellurium salt system, and 500° C. or more in a case of borate system. When the crystallization temperature is less than these temperatures, crystals do not deposit. Though the crystallization temperature is decided variably depending on a purpose, it is preferably 1 hour or more and more preferably 3 hours or more.

BEST MODE FOR CARRYING OUT THE INVENTION

Hereinafter, the present invention will be explained in detail by showing examples and comparative examples.

(Measurement of Dielectric Constant)

The sample was formed into a parallel plate and the both planes thereof were film-coated with Pt to be a electrodes. The dielectric constant thereof is measured at room temperature with automatic precise bridge B905 type made by Wayne Kerr Inc.

EMBODIMENT 1

Composition: $0.175SrO\text{-}0.175BaO\text{-}0.200Nb_2O_5 \cdot 0.0.450SiO_2\text{-}0.0005TiO_2$ (Molar Ratio)

Figure 1:
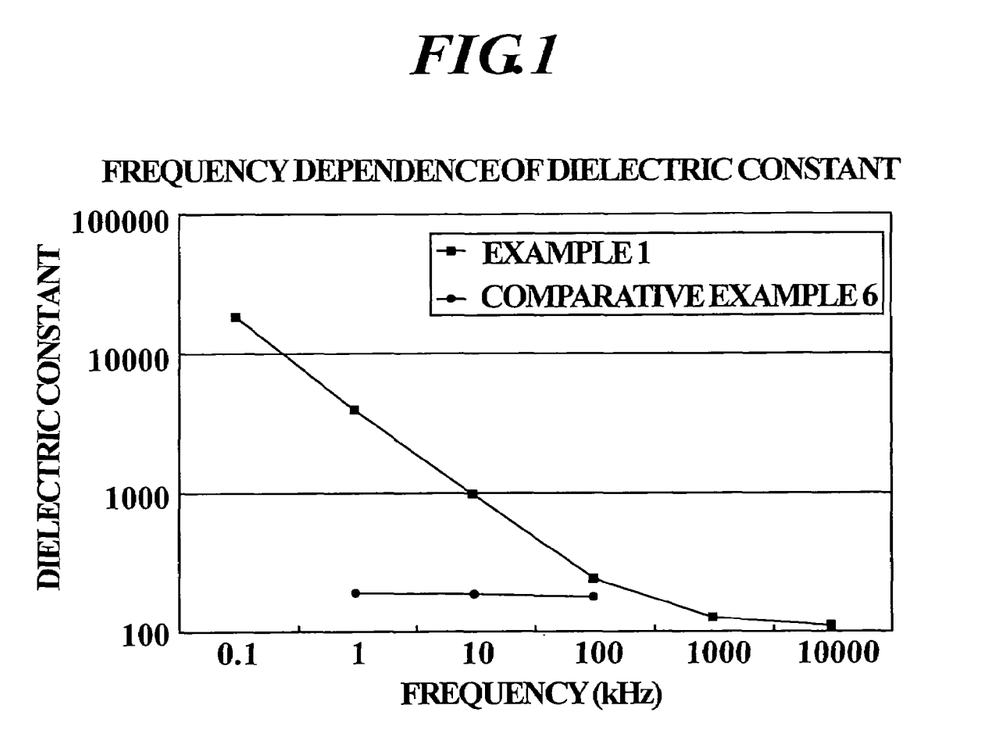
FIG. 1 is a graph showing the frequency dependence of the dielectric constant in the glass ceramics of example 1 of the invention and comparative example 6.

Raw materials ($SrCO_3$, $BaCO_3$, $Nb_2O_5$, $SiO_2$ and $TiO_2$) were blended to be the above composition ratio. After mixing them, they were melted at a melting temperature of 1360° C. for 2 hours in a quartz crucible. The melted material were cast into an iron casting board and annealed, so that a transparent original glass was obtained. The original glass was annealed at 600° C. for 12 hours and heated at 900° C. for 12 hours, so that a white colored glass ceramics was obtained. The result of X ray diffractometry shows single phase of SBN. The dielectric constant $\epsilon_1$ was 6480. Further, the dielectric constant measured at 0.1 to 10000 kHz is shown in FIG. 1. The ratio dielectric constant at 1 kHz $\epsilon_1$ to dielectric constant at 100 Hz $\epsilon_{100}$ ($\epsilon_1/\epsilon_{100}$) was 16.5. The dielectric loss tan δ was $1.9 \times 10^{-4}$. The resistance to water (RW(P)) and acid resistance (RA(P)) were evaluated according to a measuring method of chemical durability of optical glass (powder method, JOGIS). Both of them were evaluated as first class.

EXAMPLES 2 TO 5

TABLE 1

| | COMPOSITION: MOLAR RATIO | | | | | |
|---|---|---|---|---|---|---|
| | SrO | BaO | $Nb_2O_5$ | $SiO_2$ | $TiO_2$ | $\epsilon_1$ | $\epsilon_1/\epsilon_{100}$ |
| EXAMPLE 2 | 0.175 | 0.175 | 0.200 | 0.450 | 0.001 | 9032 | 25.1 |
| EXAMPLE 3 | 0.175 | 0.175 | 0.200 | 0.450 | 0.005 | 8033 | 22.5 |
| EXAMPLE 4 | 0.175 | 0.175 | 0.200 | 0.450 | 0.01 | 4059 | 16.1 |
| EXAMPLE 5 | 0.175 | 0.175 | 0.200 | 0.450 | 0.05 | 2941 | 11.3 |

In a similar process of example 1, the glass ceramics having the compositions as shown in Table 1 were obtained. The predominant crystal phases of these glass ceramics were all SBN. These glasses also shows large dielectric constants ($\epsilon_2$) as that of example 1 is. The dielectric loss tan δ was $1.9 \times 10^{-4}$ in example 2, $2.0 \times 10^{-4}$ in example 3, $3.6 \times 10^{-4}$ in example 4 and $1.9 \times 10^{-3}$ in example 5.

EXAMPLES 6 TO 10

TABLE 2

| | COMPOSITION: MOLAR RATIO | | | | | |
|---|---|---|---|---|---|---|
| | SrO | BaO | $Nb_2O_5$ | $SiO_2$ | $TiO_2$ | $\epsilon_1$ |
| EXAMPLE 6 | 0.0875 | 0.2625 | 0.200 | 0.450 | 0.002 | 31 |
| EXAMPLE 7 | 0.1750 | 0.1750 | 0.200 | 0.450 | 0.002 | 259 |
| EXAMPLE 8 | 0.2625 | 0.0875 | 0.200 | 0.450 | 0.002 | 1215 |
| EXAMPLE 9 | 0.2800 | 0.0700 | 0.200 | 0.450 | 0.002 | 176 |
| EXAMPLE 10 | 0.3500 | — | 02.00 | 0.450 | 0.002 | 108 |

In a similar process of example 1, except the annealing period was 5 hours and the crystallization temperature was lowered to 800° C., the glass ceramics having the compositions as shown in Table 2 were obtained. They all contain SBN crystal phase.

EXAMPLES 11 TO 14

TABLE 3

| | COMPOSITION: MOLAR RATIO | | | | | |
|---|---|---|---|---|---|---|
| | SrO | BaO | $Nb_2O_5$ | $SiO_2$ | $B_2O_3$ | $\epsilon_1$ |
| EXAMPLE 11 | 0.154 | 0.154 | 0.154 | 0.513 | 0.026 | 116 |
| EXAMPLE 12 | 0.162 | 0.162 | 0.162 | 0.432 | 0.081 | 113 |
| EXAMPLE 13 | 0.190 | 0.190 | 0.190 | 0.286 | 0.143 | 118 |
| EXAMPLE 14 | 0.188 | 0.188 | 0.188 | 0.188 | 0.250 | 274 |

In a similar process of example 1, the glass ceramics having the compositions as shown in Table 3 were obtained. They all contain SBN crystals. Considering the resistance to water and resistance to strong base and strong acid, a presence of Si improves resistance to water and alkali resistance.

EXAMPLES 15 TO 19

TABLE 4

| | COMPOSITION: MOLAR RATIO | | | | | | |
|---|---|---|---|---|---|---|---|
| | SrO | BaO | $Nb_2O_5$ | $SiO_2$ | $B_2O_3$ | $TiO_2$ | $\epsilon_1$ |
| EXAMPLE 15 | 0.263 | 0.088 | 0.200 | 0.450 | — | 0.002 | 108 |
| EXAMPLE 16 | 0.275 | 0.092 | 0.209 | 0.377 | 0.047 | 0.002 | 176 |
| EXAMPLE 17 | 0.278 | 0.093 | 0.212 | 0.358 | 0.060 | 0.002 | 1215 |
| EXAMPLE 18 | 0.296 | 0.099 | 0.225 | 0.254 | 0.127 | 0.002 | 258 |
| EXAMPLE 19 | 0.316 | 0.105 | 0.241 | 0.135 | 0.203 | 0.002 | 31 |

The composition ratio SrO/BaO was set about 3, the composition ratio of the glass former was changed in terms of $SiO_2/B_2O_3$, and a specific amount of crystal nuclei forming agent $TiO_2$ was added, so that the glass ceramics having the compositions as shown in Table 4 were obtained. They all contain SBN crystal phase. Compared to Table 3, the dielectric constant $\epsilon_1$ was high at intermediate composition ratio.

EXAMPLES 20 TO 22

TABLE 5

| | COMPOSITION: MOLAR RATIO | | | | | | | |
|---|---|---|---|---|---|---|---|---|
| | SrO | BaO | $Nb_2O_5$ | $SiO_2$ | $TiO_2$ | ZnO | $ZrO_2$ | $\epsilon_1$ |
| EXAMPLE 20 | 0.225 | 0.225 | 0.200 | 0.350 | 0.010 | — | — | 215 |
| EXAMPLE 21 | 0.175 | 0.175 | 0.200 | 0.450 | — | 0.001 | — | 6535 |
| EXAMPLE 22 | 0.225 | 0.225 | 0.200 | 0.350 | — | — | 0.010 | 195 |

The glass ceramics having the compositions as shown in Table 5 were obtained. It was confirmed that all the glass ceramics of examples 20 to 22 contain SBN crystal phase.

EXAMPLE 23

$0.195SrO-0.195BaO-0.320Nb_2O_5 0.0.290B_2O_3$ (Molar Ratio)

Raw materials ($SrCO_3$, $BaCO_3$, $Nb_2O_5$ and $H_3BO_3$) were blended to be the above composition and mixed. The materials were melted at a melting temperature of 1200° C. for 2 hours in a quartz crucible. The melting material was cast into an iron casting board and quenched, so that a transparent original glass was obtained. The original glass was annealed at 600° C. for 12 hours, heated at 800° C. for 24 hours, so that a white colored glass ceramics was obtained. The result of X ray diffractometry showed only SBN crystal phase. The dielectric constant $\epsilon_1$ was 150.

EXAMPLES 24 TO 28

TABLE 6

| | COMPOSITION: MOLAR RATIO | | | | |
|---|---|---|---|---|---|
| | SrO | BaO | $Nb_2O_5$ | $B_2O_3$ | $\epsilon_1$ |
| EXAMPLE 24 | 0.110 | 0.110 | 0.220 | 0.560 | 50 |
| EXAMPLE 25 | 0.205 | 0.205 | 0.210 | 0.380 | 125 |
| EXAMPLE 26 | 0.305 | 0.305 | 0.180 | 0.210 | 17 |
| EXAMPLE 27 | 0.380 | 0.380 | 0.060 | 0.180 | 15 |
| EXAMPLE 28 | 0.250 | 0.250 | 0.060 | 0.440 | 28 |

In a similar process of example 23, the glass ceramics having the compositions as shown in Table 6 were obtained. It was confirmed that all the glass ceramics of examples 24 to 28 contain SBN crystal phase.

EXAMPLE 29

An embodiment of transparent glass ceramics having SBN crystal phase and composition of high concentration borate glass former will be shown.

Composition: $0.125SrO-0.125BaO-0.080Nb_2O_5 0.0.670B_2O_3$ (Molar Ratio)

Raw materials ($SrCO_3$, $BaCO_3$, $Nb_2O_5$ and $H_3BO_3$) were blended to be the above composition and mixed. The materials were melted at a melting temperature of 1200° C. at 2 hours in a quartz crucible. The melting material was cast into an iron casting board and quenched, so that a transparent original glass was obtained. The original glass was annealed at 500° C. for 12 hours, and subject to heat treatments at 600° C., 610° C., 620° C. and 640° C. respectively for 12 hours.

By the heat treatment less than 610° C. or less, the solid became transparent inclining to white. The result of X ray diffractometry shows a diffraction of only 00n surface of a SBN crystal. As for the results of the heat treatment at higher temperature at 620° C. and 640° C., it was approximately translucent. As for the measurement result of the dielectric constant $\epsilon_1$, the dielectric constant $\epsilon_1$ of the transparent original glass was 9.1 and the dielectric constant $\epsilon_1$ of the translucent glass ceramics was 14.1.

EXAMPLE 30

Composition: 0.150SrO-0.150BaO-0.200Nb$_2$O$_5$0.0.500TeO$_2$ (Molar Ratio)

Raw materials (SrCO$_3$, BaCO$_3$, Nb$_2$O$_5$ and TeO$_2$) were blended to be the above composition and mixed. The materials were melted at a melting temperature of 1200° C. for 2 hours in a quartz crucible. The melting material was cast into an iron casting board and quenched, so that a yellow colored transparent original glass was obtained. The original glass was annealed at 500° C. for 12 hours, and heated at 700° C. for 12 hours to be crystallized. By the crystallization, the glass became yellowish white. As for the crystalline structure, SBN crystal was observed as its single phase. The dielectric constant $\epsilon_1$ was 50.

EXAMPLES 31 TO 35

TABLE 7

| | COMPOSITION: MOLAR RATIO | | | | |
|---|---|---|---|---|---|
| | SrO | BaO | Nb$_2$O$_5$ | TeO$_2$ | $\epsilon_1$ |
| EXAMPLE 31 | 0.175 | 0.175 | 0.200 | 0.450 | 41 |
| EXAMPLE 32 | 0.250 | 0.250 | 0.100 | 0.400 | 25 |
| EXAMPLE 33 | 0.150 | 0.150 | 0.050 | 0.650 | 17 |
| EXAMPLE 34 | 0.100 | 0.100 | 0.100 | 0.700 | 20 |
| EXAMPLE 35 | 0.125 | 0.125 | 0.200 | 0.550 | 43 |

In a similar process of example 30, the glass ceramics having the compositions as shown in Table 7 were obtained. All the glass ceramics of examples 31 to 35 comprise SBN as the predominant crystal phase thereof.

COMPARATIVE EXAMPLE 1

Silicate System

Composition: 0.100SrO-0.100BaO-0.200Nb$_2$O$_5$0.0.600SiO$_2$ (Molar Ratio)

Raw materials (SrCO$_3$, BaCO$_3$, Nb$_2$O$_5$ and SiO$_2$) were blended to be the above composition ratio and mixed. The materials were melted at a melting temperature of 1350° C. for 2 hours in a quartz crucible. The melting material was cast into an iron casting board and quenched, so that a solid was obtained. The solid was identified by a X-ray diffractometry, and was found to be a SBN crystallized material. It was impossible to produce a transparent original glass.

COMPARATIVE EXAMPLES 2 TO 4

Silicate System

TABLE 8

| | COMPOSITION: MOLAR RATIO | | | |
|---|---|---|---|---|
| | SrO | BaO | Nb$_2$O$_5$ | SiO$_2$ |
| COMPARATIVE EXAMPLE 2 | 0.175 | 0.175 | 0.350 | 0.300 |
| COMPARATIVE EXAMPLE 3 | 0.185 | 0.185 | 0.030 | 0.600 |
| COMPARATIVE EXAMPLE 4 | 0.335 | 0.335 | 0.030 | 0.300 |

In a similar process of comparative example 1, except the composition of comparative example 1 was changed to that as shown in Table 8, the solids of comparative examples 2 to 4 were obtained. However, these solids were all opaque. It was impossible to obtain an original glass.

COMPARATIVE EXAMPLE 5

Silicate System

Composition: 0.225SrO-0.225BaO-0.200Nb$_2$O$_5$0.0.450SiO$_2$ (Molar Ratio)

In a similar process of comparative example 1, the transparent original glass having the above composition was obtained. The obtained glass was crystallized at 900° C. for 12 hours. Evaluating the crystalline structure thereof by X-ray diffractometry, the-result showed a single phase of SBN. The measuring results of the dielectric constant measured at 1 to 100 kHz were shown in FIG. 1. The dielectric constant $\epsilon_1$ at 1 kHz was 190, and the ratio dielectric constant at 1 kHz $\epsilon_1$ to dielectric constant at 100 kHz $\epsilon_{100}$ ($\epsilon_1/\epsilon_{100}$) was 1.08. The dielectric constant at frequency within this range merely varied.

COMPARATIVE EXAMPLE 6

Composition: 0.175SrO-0.175BaO-0.200Nb$_2$O$_5$0.0.450SiO$_2$ (Molar Ratio)

In a similar process of comparative example 1, the transparent original glass having the above composition was obtained. The obtained glass was crystallized at 600° C. for 12 hours. Evaluating the crystalline structure by X-ray diffractometry, the result shows a single phase of SBN. The dielectric constant $\epsilon_1$ at 1 kHz was 600, and the ratio dielectric constant at 1 kHz $\epsilon_1$ to dielectric constant at 100 kHz $\epsilon_{100}$ ($\epsilon_1/\epsilon_{100}$) was 2.0. The variation of the dielectric constant at a frequency within this range was small (FIG. 1).

COMPARATIVE EXAMPLE 7

Borate System

Composition: 0.075SrO-0.075BaO-0.150Nb$_2$O$_5$0.0.700B$_2$O$_3$ (Molar Ratio)

Raw materials (SrCO$_3$, BaCO$_3$, Nb$_2$O$_5$ and H$_3$BO$_3$) were blended to be the above composition ratio and mixed. The materials were melted at a melting temperature of 1200° C. for 2 hours in a quartz crucible. The melting material was cast into an iron casting board and quenched, so that a solid was obtained.

The solid was identified by a X-ray diffractometry, and the solid was a SBN crystallized material. It was impossible to produce an original glass of a glass ceramics.

COMPARATIVE EXAMPLES 8 TO 10

Borate System

TABLE 9

| | COMPOSITION: MOLAR RATIO | | | |
|---|---|---|---|---|
| | SrO | BaO | $Nb_2O_5$ | $H_3BO_3$ |
| COMPARATIVE EXAMPLE 8 | 0.200 | 0.200 | 0.400 | 0.200 |
| COMPARATIVE EXAMPLE 9 | 0.135 | 0.135 | 0.030 | 0.700 |
| COMPARATIVE EXAMPLE 10 | 0.385 | 0.385 | 0.030 | 0.200 |

In a similar process of comparative example 5, the solids of comparative examples 6 to 8 having the compositions as shown in Table 9 were obtained. However, it was impossible to obtain an original glass as it was in comparative example 5.

COMPARATIVE EXAMPLE 11

Tellurium Salt System

Composition: $0.075SrO\text{-}0.075BaO\text{-}0.150Nb_2O_5\text{-}0.700TeO_2$ (Molar Ratio)

Raw materials ($SrCO_3$, $BaCO_3$, $Nb_2O_5$ and $TeO_2$) were blended to be the above composition ratio and mixed. The materials were melted at a melting temperature of 1000° C. for 1 hours in a quartz crucible. The melting material was cast into an iron casting board and quenched, so that a yellow colored solid was obtained.

The yellow colored solid was identified by X-ray diffractometry, and was found to be a SBN crystallized material. Thus, it was impossible to obtain an original glass.

COMPARATIVE EXAMPLES 12 TO 14

Tellurium Salt System

TABLE 10

| | COMPOSITION: MOLAR RATIO | | | |
|---|---|---|---|---|
| | SrO | BaO | $Nb_2O_5$ | $TeO_2$ |
| COMPARATIVE EXAMPLE 12 | 0.165 | 0.165 | 0.330 | 0.340 |
| COMPARATIVE EXAMPLE 13 | 0.135 | 0.135 | 0.030 | 0.700 |
| COMPARATIVE EXAMPLE 14 | 0.315 | 0.315 | 0.030 | 0.340 |

In a similar process of comparative example 11, except the melting temperature was 1200° C. in comparative examples 12 and 14 and 1000° C. in comparative example 13, the solids of comparative examples 12 to 14 having the compositions as shown in Table 10 were obtained. However, it was impossible to obtain an original glass.

COMPARATIVE EXAMPLES 15 TO 17

Tellurium Salt System

TABLE 11

| | COMPOSITION: MOLAR RATIO | | | |
|---|---|---|---|---|
| | SrO | BaO | $Nb_2O_5$ | $TeO_2$ |
| COMPARATIVE EXAMPLE 15 | 0.075 | 0.075 | 0.200 | 0.650 |
| COMPARATIVE EXAMPLE 16 | 0.050 | 0.050 | 0.200 | 0.700 |
| COMPARATIVE EXAMPLE 17 | 0.050 | 0.050 | 0.250 | 0.650 |

In a similar process of comparative example 11, the glasses of comparative examples 15 to 17 having the compositions of Table 11 were obtained. The color of the glasses became deeper with $TeO_2$ being higher concentration. The obtained glasses were crystallized at 700° C. for 12 hours, and the crystalline structures thereof were evaluated by a X ray diffractometry. However they were not SBN.

INDUSTRIAL APPLICABILITY

The glass ceramics of the invention is expected to be applied to various condenser materials, a material for capacitor, a 90° phase shifter, a material for high frequency noise measures, a piezoelectric vibrator, a surface acoustic wave material (SAW filter) and the like.

The invention claimed is:

1. A glass ceramics having a chemical composition of $aRO \cdot bNb_2O_5 \cdot cSiO_2 \cdot dB_2O_3 \cdot eTeO_2 \cdot fX$, where R represents Ba and/or Sr, X represents one or more oxide selected from the group consisting of $TiO_2$, $ZrO_2$, $P_2O_5$ and ZnO, $a > b \geq 0.05$, $0.60 \geq c \geq 0$, $0.70 \geq d \geq 0$, $0.70 \geq e \geq 0$, $c+d+e \geq 0.175$, $a+b+c+d+e=1.0$ and $0.10 \geq f \geq 0$.

2. The glass ceramics as claimed in claim 1, wherein the chemical composition is $aRO \cdot bNb_2O_5 \cdot cSiO_2 \cdot fX$, where R represents Ba and/or Sr, X represents one or more oxide selected from the group consisting of $TiO_2$, $ZrO_2$, $P_2O_5$ and ZnO, $a > b \geq 0.05$, $0.60 \geq c \geq 0.30$, $a+b+c=1.0$ and $0.10 \geq f > 0$.

3. A glass ceramics comprising two or more glass formers selected from the group consisting of silicon oxide, boron oxide and tellurium oxide, and the glass ceramics having a chemical composition of $aRO \cdot bNb_2O_5 \cdot cSiO_2 \cdot dB_2O_3 \cdot eTeO_2 \cdot fX$, where R represents Ba and/or Sr, X represents one or more oxide selected from the group consisting of $TiO_2$, $ZrO_2$, $P_2O_5$ and ZnO, $a > b \geq 0.05$, $0.55 \geq c \geq 0$, $0.70 \geq d \geq 0$, $0.70 \geq e \geq 0$, $c+d+e \geq 0.175$, $a+b+c+d+e=1.0$ and $0.10 \geq f \geq 0$.

4. A glass ceramics having a chemical composition of $aRO \cdot bNb_2O_5 \cdot dB_2O_3 \cdot fX$, where R represents Ba and/or Sr, X represents one or more oxide selected from the group consisting of $TiO_2$, $ZrO_2$, $P_2O_5$ and ZnO, $a > b \geq 0.05$, $0.70 \geq d \geq 0.175$, $a+b+d=1.0$ and $0.10 \geq f \geq 0$.

5. A glass ceramics having a chemical composition of $aRO \cdot bNb_2O_5 \cdot eTeO_2 \cdot fX$, where R represents Ba and/or Sr, X represents one or more oxide selected from the group consisting of $TiO_2$, $ZrO_2$, $P_2O_5$ and ZnO, $a > b \geq 0.05$, $0.70 \geq e \geq 0.35$, $a+b+e=1.0$ and $0.10 \geq f \geq 0$.

6. The glass ceramics as claimed in claim 1, wherein a ratio dielectric constant at 1 kHz $\epsilon_1$ to dielectric constant at 100 kHz $\epsilon_{100}$, which is denoted as $\epsilon_1/\epsilon_{100}$, is 10 or more.

7. The glass ceramics as claimed in claim 2, wherein a ratio dielectric constant at 1 kHz $\epsilon_1$ to dielectric constant at 100 kHz $\epsilon_{100}$, which is denoted as $\epsilon_1/\epsilon_{100}$, is 10 or more.

8. The glass ceramics as claimed in claim 3, wherein a ratio dielectric constant at 1 kHz $\epsilon_1$ to dielectric constant at 100 kHz $\epsilon_{100}$, which is denoted as $\epsilon_1/\epsilon_{100}$, is 10 or more.

9. The glass ceramics as claimed in claim 4, wherein a ratio dielectric constant at 1 kHz $\epsilon_1$ to dielectric constant at 100 kHz $\epsilon_{100}$, which is denoted as $\epsilon_1/\epsilon_{100}$, is 10 or more.

10. The glass ceramics as claimed in claim 5, wherein a ratio dielectric constant at 1 kHz $\epsilon_1$ to dielectric constant at 100 kHz $\epsilon_{100}$, which is denoted as $\epsilon_1/\epsilon_{100}$, is 10 or more.

* * * * *

UNITED STATES PATENT AND TRADEMARK OFFICE
CERTIFICATE OF CORRECTION

PATENT NO. : 7,053,015 B2
APPLICATION NO. : 10/506178
DATED : May 30, 2006
INVENTOR(S) : Yasuo Ochi It is certified that error appears in the above-identified patent and that said Letters Patent is hereby corrected as shown below:

On the cover page, at [57] Abstract, line 2, change
"$aRO.bNb_2.O_5.cSiO_2.dB_2O_3.eTeO_2.fX$" to --$aRO·bNb_2O_5·cSiO_2·dB_2O_3·eTeO_2·fX$--.

On cover page, at [75], change inventor's residence "Kunitachi" to --Kunitachi-shi--.

Col. 1, line 7 change "$aRO.bNb_2O_5.cSiO_2.dB_2O_3.eTeO_2.fX$" to
--$aRO·bNb_2O_5·cSiO_2·dB_2O_3·eTeO_2·fX$--.

Col. 2, line 10, change "$aRO.bNb_2O_5.cSiO_2.dB_2O_3.eTeO_2.fX$" to
 --$aRO·bNb_2O_5·cSiO_2·dB_2O_3·eTeO_2·fX$--;
Line 16, change $aRO.bNb_2O_5.cSiO_2.fX$: to
 --$aRO·bNb_2O_5·cSiO_2·fX$--;
Line 25, change "$aRO.bNb_2O_5.cSiO_2.dB_2O_3.eTeO_2.fX$" to
--$aRO·bNb_2O_5·cSiO_2·dB_2O_3·eTeO_2·fX$--;
Line 32, change "$aRO.bNb_2O_5.dB_2O_3.fX$" to --$aRO·bNb_2O_5·dB_2O_3·fX$--;
Line 38, change "$aRO.bNb_2O_5.eTeO_2.fX$" to --$aRO·bNb_2O_5·eTeO_2·fX$--;
Line 47, change "$aRO.bNb_2O_5.cSiO_2.dB_2O_3.eTeO_2.fX$" to
--$aRO·bNb_2O_5·cSiO_2dB_2O_3·eTeO_2·fX$--.

Col. 3, line 20, change "$aRO.bNb_2O_5.cSiO_2.dB_2O_3.eTeO_2.fX$" to
--$aRO·bNb_2O_5·cSiO_2·dB_2O_3·eTeO_2·fX$--.

Col. 4, line 28, change "$0.200Nb_2O_50.0.450SiO_2-0.0005TiO_2$ (Molar Ratio)" to
--$0.200Nb_2O_5-0.450SiO_2-0.0005TiO_2$ (Molar Ratio)--.

Col. 6, line 22, change. "$0.195SrO-0.195BaO-0.320Nb_2O_50.0.290B_2O_3$ (Molar" to --$0.195SrO-0.195BaO-0.320Nb_2O5-0.290B_2O_3$ (Molar--;
Line 61, change "$0.080Nb_2O_50.0.670B_2O_3$ (Molar Ratio)" to
--$0.080Nb_2O_5-0.670B_2O_3$ (Molar Ratio)--.

Col. 7, line 19, change "$0.200Nb_2O_50.0.500TeO_2$ (Molar Ratio)" to
--$0.200Nb_2O_5-0.500TeO_2$ (Molar Ratio)--;
Line 59, change "$0.200Nb_2O_50.0.600SiO_2$ (Molar Ratio)" to
--$0.200Nb_2O_5-0.600SiO_2$ (Molar Ratio)--.

UNITED STATES PATENT AND TRADEMARK OFFICE
CERTIFICATE OF CORRECTION

PATENT NO. : 7,053,015 B2
APPLICATION NO. : 10/506178
DATED : May 30, 2006
INVENTOR(S) : Yasuo Ochi It is certified that error appears in the above-identified patent and that said Letters Patent is hereby corrected as shown below:

Col. 8, line 27, change "$0.200Nb_2O_50.0.450SiO_2$ (Molar Ratio)" to --$0.200Nb_2O_5-0.450SiO_2$ (Molar Ratio)--;

Line 32, change "the-result" to --the result--;

Line 44, change "$0.200Nb_2O_50.0.450SiO_2$ (Molar Ratio)" to --$0.200Nb_2O_5-0.450SiO_2$ (Molar Ratio)--;

Line 61, change "$0.150Nb_2O_50.0.700B_2O_3$ (Molar Ratio)" to --$0.150Nb_2O_5-0.700B_2O_3$ (Molar Ratio)--.

Col. 9, line 34, change "$0.150Nb_2O_50.0.700TeO_2$ (Molar Ratio)" to --$0.150Nb_2O_5-0.700TeO_2$ (Molar Ratio)--.

IN THE CLAIMS

Claim 1, line 2, change "$aRO.bNb_2O_5.cSiO_2.dB_2O_3.eTeO_2.fx$" to --$aRO\cdot bNb_2O_5\cdot cSiO_2\cdot O_3\cdot eTeO_2\cdot fX$--.

Claim 2, line change "$aRO.bNb_2O_5.cSiO_2.fX$" to --$aRO\cdot bNb_2O_5\cdot cSiO_2\cdot fX$--.

Claim 3, line 5, change "$aRO.bNb_2O_5.cSiO_2.dB_2O_3.eTeO_2.fX$" to --$aRO\cdot bNb_2O_5\cdot cSiO_2\cdot dB_2O_3\cdot eTeO_2\cdot fX$--.

Claim 4, line 2, change "$aRO.bNb_2O_5.dB_2O_3.fX$" to --$aRO\cdot bNb_2O_5\cdot dB_2O_3\cdot fX$--.

UNITED STATES PATENT AND TRADEMARK OFFICE
CERTIFICATE OF CORRECTION

PATENT NO. : 7,053,015 B2
APPLICATION NO. : 10/506178
DATED : May 30, 2006
INVENTOR(S) : Yasuo Ochi It is certified that error appears in the above-identified patent and that said Letters Patent is hereby corrected as shown below:

Claim 5, line 2, change "$aRO.bNb_2O_5.eTeO_2.fX$" to --$aRO\cdot bNb_2O_5\cdot eTeO_2\cdot fX$--.

Signed and Sealed this

Seventeenth Day of October, 2006

JON W. DUDAS
*Director of the United States Patent and Trademark Office*